United States Patent [19]

Lechner et al.

[11] 4,309,766
[45] Jan. 5, 1982

[54] ARRANGEMENT FOR SUBSCRIBER CIRCUITS UTILIZING DIGITAL TIME DIVISION MULTIPLEX TELECOMMUNICATION INSTALLATIONS AND PARTICULARLY FOR PCM LOCAL EXCHANGES

[75] Inventors: Robert Lechner, Otterfing; Hermann Monat, Wessling, both of Fed. Rep. of Germany

[73] Assignee: Siemens Aktiengesellschaft, Berlin & Munich, Fed. Rep. of Germany

[21] Appl. No.: 71,116

[22] Filed: Aug. 30, 1979

[30] Foreign Application Priority Data

Sep. 27, 1978 [DE] Fed. Rep. of Germany ....... 2842098

[51] Int. Cl.³ ............................................. H04J 3/12
[52] U.S. Cl. ..................................... 370/110; 370/56
[58] Field of Search ........................... 370/110, 58, 56; 179/18 FA, 18 F

[56] References Cited

U.S. PATENT DOCUMENTS

| | | | |
|---|---|---|---|
| 3,916,118 | 10/1975 | O'Neill | 370/58 |
| 4,104,488 | 8/1978 | Weir et al. | 179/18 FA |
| 4,143,242 | 3/1979 | Horiki | 370/110 |
| 4,146,749 | 3/1979 | Pepping et al. | 370/58 |

OTHER PUBLICATIONS

Telecom Report, Mar. 1979, pp. 174-183, Suckfull, "Architectur Einer Neuen Linie Digitaler Offentlicher Fernsprechvermittlung-en".
International Switching Symposium, Oct. 1976, pp. 423-3-1-432-3-8, Kumashiro et al., "KC260 EPABX A Small sized Stored Program Controlled Electronic Switching System".
Bell Labs Record, Feb. 1976, pp. 34-38, Chevalier et al., "Packaging Electronic Circuits for the Future".
Conference Record 1978 International Conference on Communications, Jun. 1978, pp. 37.2.1-37.2.5, Moridera et al., "Fetex Digital Switching System for Central Office".
IEEE Trans. on Parts, Hybrids & Packaging, Jun. 1972, pp. 51-58, Orr et al., "Thin Film Hybrid Integrated Circuits for Communication Systems".
IBM Technical Disclosure Bulletin, Feb. 1978, pp. 3399-3400, Gedney et al., "Low Cost Integrated Circuit".
Wescon Conference Record, Sep. 1977, pp. 15/3-1-15-/3-7, Burch et al., "Ceramic Chip Carrier-The New Standard in Packaging".
The International Symposium on Subscriber Loops & Services, Mar. 1978, 20-24., pp. 182-184, J. R. Sergo, "DDS Quad Line Circuit", Atlanta, USA.
NTC '77 Conference Record, Band 3, Dec. 1977, pp. 39:5-1-39:5-7, C. G. Svala, "DDS-1, A Digital Local Switching System with Remote Line Switches.
1978 International Zurich Seminar on Digital Communcations, Mar. 1978, pp. C6.1-C6.6, Israel et al., "Subscriber Line Equipment Techniques".
1978 International Zurich Seminar on Digital Comm., Mar. 1978, pp. A2.1-A2.5, White, "Options and Progress in Digital Local Switching".

*Primary Examiner*—Douglas W. Olms
*Attorney, Agent, or Firm*—Hill, Van Santen, Steadman, Chiara & Simpson

[57] ABSTRACT

Subscriber circuits used for connecting analog operated subscriber line to digital switching networks have analog circuit portions which are individually associated with the individual subscriber lines and also have circuits for coding and decoding signals. Digital control and interface circuits are commonly associated with a plurality of such subscriber circuits and in the present invention the analog circuit portions which are associated with a sub-group of a subscriber line and circuit for coding and decoding are combined into sub-modules such as printed circuit boards which are mounted on a common carrier plate at a spacing from the main portion of the plate so that the carrier plate forms the circuit carrier for the paths and components of the digital portion of the circuits.

4 Claims, 3 Drawing Figures

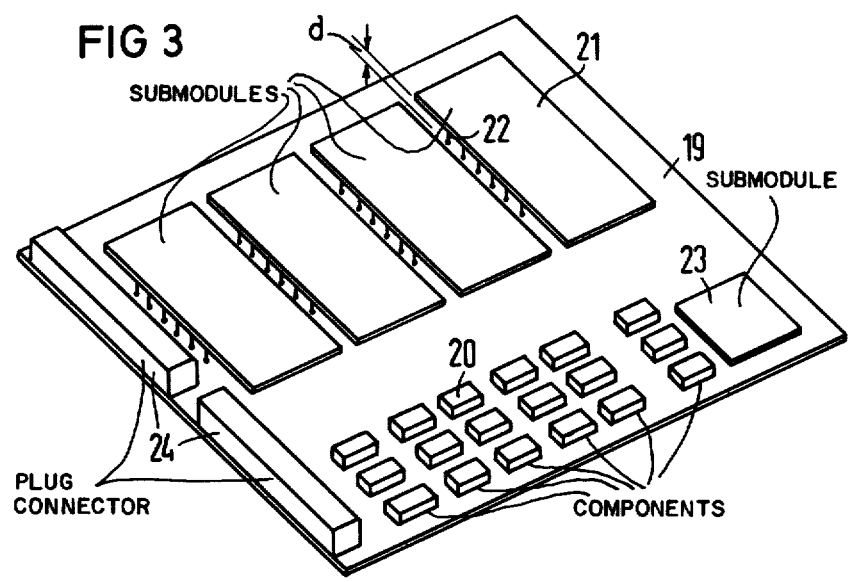

ARRANGEMENT FOR SUBSCRIBER CIRCUITS UTILIZING DIGITAL TIME DIVISION MULTIPLEX TELECOMMUNICATION INSTALLATIONS AND PARTICULARLY FOR PCM LOCAL EXCHANGES

BACKGROUND OF THE INVENTION

1. Field of the Invention

This invention relates in general to subscriber circuits for digital time division multiplex telecommunication installations and in particular to PCM local exchanges.

2. Description of the Prior Art

The advantages of digital transmission and exchange systems are generally known. The progress of microelectronics makes the possibility of a full digitalization of the exchange system appear to be possible in the future wherein transmission and exchange technology will allow the conversion of analog message signals directly to digital in the subscriber terminal equipment. At the present time, however, such full digitalized systems are too expensive. Since there are many analog systems in operation, the partial digital systems will be introduced in the forseeable future. For such systems, the existing subscriber lines and subscriber terminal equipment is operated in an analog fashion and remains unchanged. The digitalization of the analog message and control signals occur in these partially digitalized systems at the output locations of the individual subscriber lines that is at the subscriber circuits. The subscriber circuits thus form the interfaces between the analog and digital portions of the system.

The problem exists of designing the circuit carriers for the subscriber circuits which are in general designed as plugable logic cards so as to obtain comparatively large "packing density" of the components as well as the necessary testing and balancing work required for the analog circuit parts which systems can be constructed with reasonable cost. Up until the present time, it has been attempted by the use of skilled use of conductor plate disc of the logic cards to attain a satisfactory compromise the demands which contradict each other in part. Particular attention is devoted to the thermal problems which occur due to the high packing density.

SUMMARY OF THE INVENTION

The present invention creates an arrangement for subscriber circuits of digital time division multiplex telecommunication installations which makes it possible to easily test and to easily balance the related circuit portions and wherein the thermal problems due to the high packing density are satisfactorily solved.

Starting from an arrangement for subscriber circuits for the connection of subscriber lines with analog signal transmission to digital switching networks which have circuit portions for accommodation balancing and storage which are analog and which are individually associated with subscriber lines and further include circuits for the conversion of the message signals which pass from the subscriber terminal devices and are converted into digital signals by coding or respectively for conversion of the digital signals determined for the subscriber terminal device and to message signals to be transmitted by way of the subscriber line by decoding and where the circuits associated in common to the coding and decoding of a sub-group of subscriber lines which may comprise two circuits is determined by the product of the scanning frequency such as 8 kHz which forms the basis of the time division multiplex system and the conversion and transfer time necessary to totally code and decode such as 62.5 microseconds. In addition, indication circuits for the translation of control signals such as loop end and selection information which occur on the subscriber line into corresponding logical indicating circuits are utilized. The indication circuit is associated with a group of subscriber lines which consist of a number such as 8 of the previously mentioned sub-groups as well as with digital interface circuits for coupling of the digitalized message and indication signals on corresponding time division multiplex transmission paths. The present invention provides that the analog circuit portions which are associated with the individual sub-groups of subscriber lines as well as the relating circuit for coding and decoding are mechanically combined on a flat constant thickness sub-modules sub-printed circuit board and all sub-modules of a group of subscriber lines are arranged upon a common carrier plate at a distance from the carrier plate and these carrier plates form the circuit carrier for the printed circuit paths and components of the digital interface circuits.

The invention provides the following advantages:

The lines which supply the analog signals can be optimally arranged for the existing electrical demands, for example, with respect to the surge capacitance, the cross-talk and the signal to noise ratio since the spatial arrangement of the internal connections of the analog circuit portions will not be impaired by the position or direction of a line on a common carrier plate.

The testing and balancing of the analog circuit parts can be accomplished with simple testing and adjustment components for individual and total balance and the digital circuit which is arranged upon the common carrier plate can be tested with logic testing apparatus. Thus, a considerable reduction of the cost of testing results so that the overall system can be constructed and operated cheaper than the present arrangement.

The arrangement of the sub-modules sub-printed circuit boards a distance from the main plane of the common carrier plate increases the total service available of the subscriber circuit module and also provides for more advantageous heat dissipation and, thus, lowers the operating temperature so that the life span of the components will be substantially increased over systems of the prior art.

The analog circuit portions and the common digital circuit can be easily separated from each other since they are formed as sub-modules on the sub-printed circuit board and an accommodation to different transmission technical demands, for example, with respect to the transmission level, the simulation for different types of subscriber terminal devices and different applications can be easily made by individual connections and balancing of uniform prefabricated standardized sub-modules which can be mounted on the common carrier plate which contains the digital circuits.

Finally, in a simple manner, the arrangement according to the invention makes it possible to extend existing installations directly at the location of the installation and makes it easier to locate and rectify defects and faults in the system during maintenance of the installation because of the exchangeability of the sub-modules by replacing the sub-printed circuit boards.

Another feature of the invention relates to having an indication circuit which is associated with a group of subscriber lines in common and is arranged for the translation of control signals which occur on the subscriber lines into corresponding logical indication signals which occur in a sub-module. This allows the indication circuit which must under certain circumstances satisfy demands which are specific to a particular customer to be fully compatible with the system.

Such sub-module printed circuit board can be easily separately tested before it is inserted into the system and the testing can be independent of the complete circuit.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 3 illustrates an embodiment wherein the circuits of FIG. 1 are mechanically mounted on a sub-module printed circuit board for each sub-group of subscriber lines and these sub-modules are mounted on a carrier plate at a spacing from the main surface so as to provide cooling.

DESCRIPTION OF THE PREFERRED EMBODIMENTS

Figure 1:
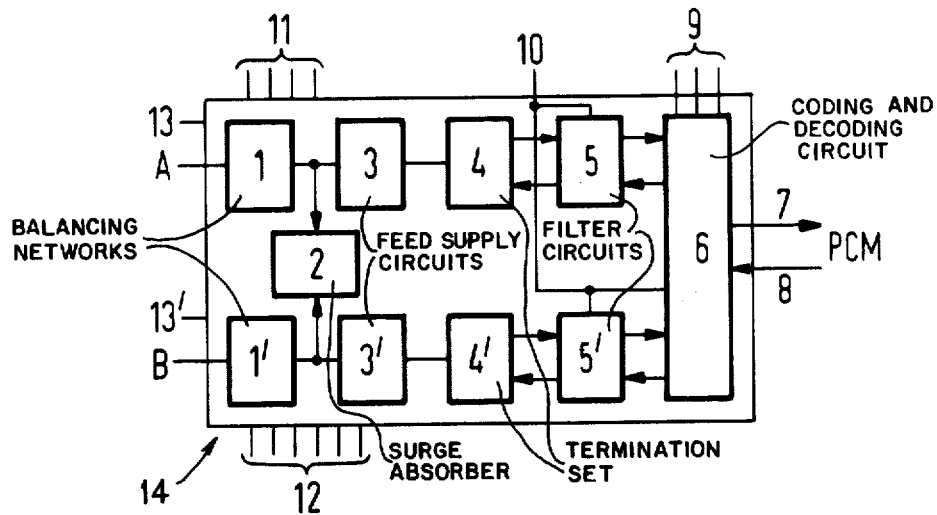
FIG. 1 is a block diagram of the analog circuit portions which are associated with a sub-group of subscriber lines and the circuit which is associated with this sub-group in common for the coding and decoding.

FIG. 1 illustrates a schematic view of apparatus for the direct connection of subscriber lines A or subscriber lines B. A first balancing network is connected to subscriber lines A and a second balancing network 1' is connected to subscriber lines B. The balancing networks 1 or 1' provide for the accommodation of various different line lengths of the individual subscriber lines for the reduction of feed power dissipation. A surge absorber such as an over voltage protection device 2 maintains the voltage spikes which occur on the subscriber lines isolated from the sensitive electronic components and is connected to the balancing networks 1 and 1'. Each of the subscriber lines provide an individual feed supply circuit 3 which is connected to the balancing network 1 or the feed supply circuit 3' which is connected to the balancing circuit 1'. A termination set 4 is connected to feed supply circuit 3 and a termination set 4' is connected to the feed supply circuit 3'. A first filtering circuit 5 is connected to the termination set 4 and a second filtering circuit 5' is connected to the termination set 4'. A circuit 6 for coding and decoding is connected to the filter circuits 5 and 5' and the analog message signals from the subscriber terminal devices which are to be connected to the subscriber lines are converted into PCM signals and transmitted by way of cable 7 to the PCM transmission path. PCM signals arrive via cable 8 and are decoded in circuit 6 which converts them back into analog message signals for the subscriber terminal devices. Coding and decoding circuit 6 is controlled by lines 9 which supply the time pulse and synchronizing signals. Input line 10 supplies control signals so as to decrease the rest break power dissipation to the circuit 6.

Lines 11 provide the necessary operating voltages to the various components of the circuit illustrated in FIG. 1. Lines 12 are connected to the analog multiplexer illustrated in FIG. 2 designated by a numeral 15 and from the analog multiplexer 15 to an indication circuit 16 for evaluation and interpretation of the control signals which appear on the subscriber lines. Lines 13 and 13' provide the connections for the call signals of the subscriber terminal devices.

The coding and decoding circuit 6 is associated with a sub-group of subscriber lines and in the present case to two subscriber lines. The number of subscriber lines which can be served by a particular circuit 6 of this type is obtained from the product of the scanning frequency which forms the base for the PCM system and the conversion and transfer time necessary for the coding and decoding. In a particular example, the scanning frequency could be 8 kHz and the conversion and transfer time could be 62.5 microseconds. The product of these values is 2 so that two subscriber lines can be connected to the circuit 6 for coding and decoding.

Figure 2:
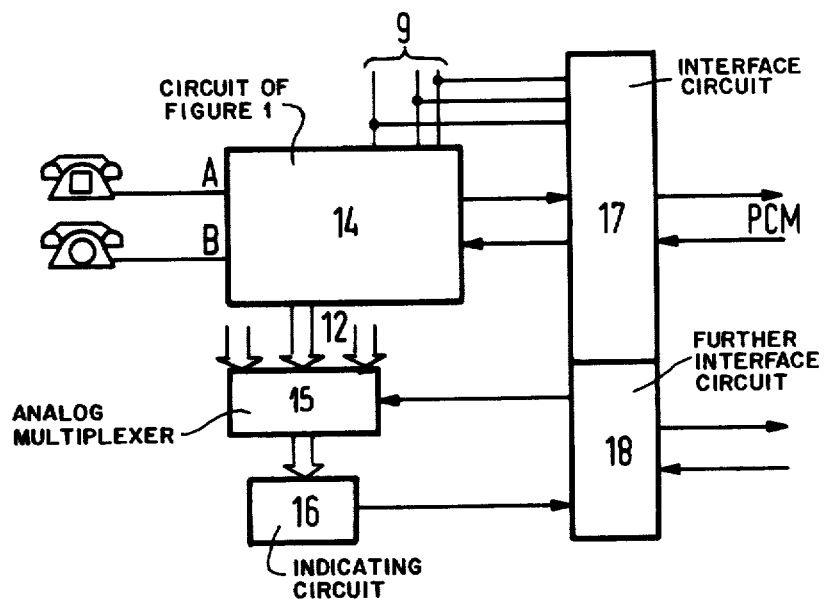
FIG. 2 illustrates the relationship of the circuit illustrated in FIG. 1 with the remaining portions of the circuit of the subscriber circuit.

FIG. 2 illustrates the circuit of FIG. 1 as the block numbered 14. The indication circuits of the circuit 14 as well as a plurality of circuits for different functions are connected to the analog multiplexer 15 by the trunks 12. The indication circuits 16 are connected to the analog multiplexer 15 and convert the signals into corresponding logic signals. The circuit 14 is connected by interface circuits 17 with a PCM transmission path for the message signals. An additional interface circuit 18 connects the analog multiplexer 15 and the indicating circuit 16 with a transmission path for the control signals.

FIG. 3 illustrates a slide-in module type logic card such as a plug-in board for constructing the circuit illustrated in FIG. 2. The module illustrated has a base plate 19 which forms the circuit carrier for the digital circuit parts illustrated in FIG. 2. The base plate 19 is preferably designed as a printed circuit board and has mounted on its upper surface components 20 for the digital circuit sections. On the base plate 19, four sub-modules sub-printed circuit elements 21 are mounted which in each case contain the analog circuit portions and components as well as the circuit for coding and decoding for a sub-group of subscriber lines. These sub-modules sub-printed circuits boards 21 are spaced a distance d from the upper surface of the base plate 19 so as to allow heat dissipation. The carrier body of the sub-modules printed circuit boards are designed as hybrid circuits and may be constructed with a ceramic substrate. The electrical and mechanical connection of the sub-module printed circuit boards 21 to the base plate 19 is made with soldering pins 22 which also assures that the spacing is maintained between the planes of the base plate 19 and the sub-modules printed circuit boards 21. The analog multiplexer 15 and the indication circuit 16 are also designed as sub-modules sub-printed circuit boards 23 and these are mounted on the base plate 19.

A pair of plug connectors 24 are mounted on the base plate 19 and provide for the connecting of the module with the wiring of a card holder and, thus, allow the printed circuit board 19 to be connected to external circuits.

Although the invention has been described with respect to preferred embodiments, it is not to be so limited as changes and modifications can be made which are within the full intended scope of the invention as defined by the appended claims.

We claim as our invention:

1. An arrangement for subscriber circuits of digital time division multiplex telecommunication installations such as PCM local exchanges for connecting subscriber lines having analog signals to digital switching networks comprising, at least two subscriber stations, a subscriber line connected to each subscriber station, a plurality of analog circuit elements associated with each subscriber line for processing analog signals, a coding and decoding time division multiplex circuit receiving and supplying digital and analog signals and converting them into analog and digital signals connected to at least two subscriber lines, with a number of subscriber lines connected to said coding and decoding circuit being limited by the product of the scanning frequency which forms the time base for the time division multiplex circuit and the conversion and transfer time which is necessary for the total and decoding in said time division multiplex circuit, an indicating circuit connected to said analog circuit elements and translating control signals on the subscriber lines into indication signals, digital interface circuits connected to said coding and decoding time division multiplex circuit, and digital trunk circuits connected to said digital interface circuits.

2. An arrangement according to claim 1 wherein said plurality of analog circuit elements and said coding and decoding time multiplex circuit associated with at least a pair of subscriber lines are combined and mounted on a planar submodule printed circuit board (21) and a plurality of sub-module printed circuit board (21) mounted upon a common carrier plate (19) and spaced and offset from said base plate, and said base plate (19) formed with printed circuit paths and with components (20) for said digital interface circuits.

3. An arrangement according to claim 2, characterized in that said sub-modules sub-printed circuit boards (21) are formed as hybrid circuits upon a plate shaped ceramic substrate and are electrically and mechanically connected to the carrier plate (19) by means of solder or plug pins (22).

4. An arrangement according to claim 2, characterized in that the indication circuit (15, 16) is formed as a sub-module sub-printed circuit board (23), which is mounted on said base plate (19).

* * * * *